US012755205B2

(12) United States Patent
Ghazi et al.

(10) Patent No.: US 12,755,205 B2
(45) Date of Patent: Oct. 6, 2026

(54) LEARNING WITH LABEL DIFFERENTIAL PRIVACY VIA PROJECTIONS

(71) Applicant: Google LLC, Mountain View, CA (US)

(72) Inventors: Badih Ghazi, Cupertino, CA (US); Yangsibo Huang, Princeton, NJ (US); Chiyuan Zhang, Mountain View, CA (US); Pasin Manurangsi, Bangkok (TH); Pritish Kamath, Mountain View, CA (US); Shanmugasundaram Ravikumar, Piedmont, CA (US)

(73) Assignee: Google LLC, Mountain View, CA (US)

( * ) Notice: Subject to any disclaimer, the term of this patent is extended or adjusted under 35 U.S.C. 154(b) by 475 days.

(21) Appl. No.: 18/530,381

(22) Filed: Dec. 6, 2023

(65) Prior Publication Data

US 2025/0190847 A1 Jun. 12, 2025

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 10,395,180 | B2 | 8/2019 | Wang et al. | |
| 11,126,893 | B1 * | 9/2021 | Laaser | G06F 18/217 |
| 11,200,511 | B1 * | 12/2021 | London | G06N 3/09 |
| 11,475,350 | B2 | 10/2022 | McMahan et al. | |
| 11,580,380 | B2 * | 2/2023 | Moloney | G06V 10/82 |
| 11,663,061 | B2 * | 5/2023 | Barthur | G06F 9/542 706/12 |
| 11,726,769 | B2 | 8/2023 | McMahan et al. | |
| 11,853,391 | B1 * | 12/2023 | Ladkat | G06N 3/063 |
| 11,887,003 | B1 * | 1/2024 | Bopardikar | G06N 20/00 |
| 11,907,403 | B2 * | 2/2024 | Ou | G06N 3/0985 |
| 12,242,613 | B2 * | 3/2025 | Sinn | G06N 20/00 |
| 12,412,038 | B2 * | 9/2025 | Dernoncourt | G06F 40/295 |
| 12,530,488 | B2 * | 1/2026 | Marathe | G06F 21/6245 |

(Continued)

FOREIGN PATENT DOCUMENTS

| | | | |
|---|---|---|---|
| CN | 111626063 | B | 12/2020 |
| CN | 116663063 | A | 8/2023 |

OTHER PUBLICATIONS

Nicolas Papernot, Shuang Song, Ilya Mironov, Ananth Raghunathan, Kunal Talwar, and Ulfar Erlingsson. Scalable private learning with Pate. In ICLR, 2018. 34 pages.

(Continued)

*Primary Examiner* — David E Choi
(74) *Attorney, Agent, or Firm* — Lerner David LLP

(57) ABSTRACT

Aspects of the disclosure are directed to implementing a projection-based stochastic gradient descent technique that maintains label differential privacy when training one or more machine learning models. The technique includes denoising gradients by exploiting projections when training the machine learning models to improve performance of the trained machine learning models while maintaining label differential privacy. For instance, the projection-based stochastic gradient descent technique can improve performance of machine learning models in higher-privacy regimes, such as digital content management.

20 Claims, 9 Drawing Sheets

(56) References Cited

U.S. PATENT DOCUMENTS

| | | | | |
|---|---|---|---|---|
| 12,591,804 | B2 * | 3/2026 | Akdeniz | G06N 20/00 |
| 2017/0213148 | A1 * | 7/2017 | Mytkowicz | G06N 20/00 |
| 2019/0122076 | A1 * | 4/2019 | Sen | G06N 7/01 |
| 2019/0354810 | A1 * | 11/2019 | Samel | G06N 20/00 |
| 2020/0202257 | A1 * | 6/2020 | Lee | G06V 10/7784 |
| 2020/0364617 | A1 * | 11/2020 | Luong | G06N 3/084 |
| 2021/0064760 | A1 * | 3/2021 | Sharma | G06F 21/577 |
| 2021/0089882 | A1 * | 3/2021 | Sun | G06N 3/04 |
| 2021/0089883 | A1 * | 3/2021 | Li | G06N 3/08 |
| 2021/0089960 | A1 * | 3/2021 | Gupta | G06N 20/00 |
| 2021/0166157 | A1 * | 6/2021 | Bhowmick | G06N 3/04 |
| 2021/0326698 | A1 * | 10/2021 | Bukharev | G06N 3/09 |
| 2021/0326745 | A1 * | 10/2021 | Chen | G06N 20/00 |
| 2021/0357776 | A1 * | 11/2021 | Quader | G06N 20/20 |
| 2022/0044149 | A1 * | 2/2022 | Rand | G06N 20/00 |
| 2022/0092269 | A1 * | 3/2022 | Le | G06N 3/088 |
| 2022/0171996 | A1 * | 6/2022 | Nguyen | G06F 18/2148 |
| 2022/0180246 | A1 * | 6/2022 | Mondal | G06N 20/00 |
| 2022/0270590 | A1 * | 8/2022 | Beaufays | G10L 15/30 |
| 2022/0292387 | A1 * | 9/2022 | Zhou | G06N 3/0442 |
| 2022/0300791 | A1 * | 9/2022 | DeLaRosa | G06N 3/0442 |
| 2022/0300855 | A1 * | 9/2022 | Bibireata | G06N 20/00 |
| 2022/0405531 | A1 * | 12/2022 | Stanton | G06N 20/20 |
| 2023/0019779 | A1 * | 1/2023 | Santana De Oliveira | G06N 3/084 |
| 2023/0031691 | A1 * | 2/2023 | Carroll | G06N 3/045 |
| 2023/0044078 | A1 * | 2/2023 | Kumar | G06N 3/08 |
| 2023/0052231 | A1 * | 2/2023 | Marathe | G06F 21/6245 |
| 2023/0058219 | A1 * | 2/2023 | Vinayagamurthy | G06F 16/285 |
| 2023/0103911 | A1 * | 4/2023 | Thakkar | G06N 3/08 706/16 |
| 2023/0125150 | A1 * | 4/2023 | Cutler | G06F 18/214 706/15 |
| 2023/0196081 | A1 * | 6/2023 | Nguyen | G06N 3/084 706/15 |
| 2023/0215139 | A1 * | 7/2023 | Sikka | G06N 3/0464 382/155 |
| 2023/0267216 | A1 * | 8/2023 | Santana De Oliveira | G06F 21/60 726/26 |
| 2023/0351042 | A1 * | 11/2023 | De | G06F 21/6245 |
| 2023/0368337 | A1 * | 11/2023 | Karras | G06T 5/70 |
| 2023/0394374 | A1 * | 12/2023 | Marathe | G06F 21/6245 |
| 2024/0054391 | A1 * | 2/2024 | Guha Thakurta | G06N 3/063 |
| 2024/0062040 | A1 * | 2/2024 | Chakraborty | G06N 3/045 |
| 2024/0095583 | A1 * | 3/2024 | Austin | G06N 3/088 |
| 2024/0111894 | A1 * | 4/2024 | Kreis | G06N 3/084 |
| 2024/0144027 | A1 * | 5/2024 | Ong | G06N 20/20 |
| 2024/0152649 | A1 * | 5/2024 | Kao | G06F 21/6245 |
| 2024/0160925 | A1 * | 5/2024 | Wu | G06N 3/084 |
| 2024/0169269 | A1 * | 5/2024 | Sikka | G06N 3/0464 |
| 2024/0193431 | A1 * | 6/2024 | Davis | G06N 20/00 |
| 2024/0193432 | A1 * | 6/2024 | Bean | G06N 20/00 |
| 2024/0212109 | A1 * | 6/2024 | Sasaki | G06T 5/70 |
| 2024/0224064 | A1 * | 7/2024 | Marzban | H04W 16/22 |
| 2024/0265294 | A1 * | 8/2024 | Ghazi | G06N 7/01 |
| 2024/0273353 | A1 * | 8/2024 | Rieder | G06N 3/08 |
| 2024/0394597 | A1 * | 11/2024 | Marathe | G06N 20/00 |
| 2024/0403671 | A1 * | 12/2024 | Barrad | G06N 7/01 |
| 2024/0428132 | A1 * | 12/2024 | Goodsitt | G06N 20/00 |
| 2025/0037729 | A1 * | 1/2025 | Sun | G10L 21/0232 |
| 2025/0100133 | A1 * | 3/2025 | Saravanos | B25J 9/161 |
| 2025/0103899 | A1 * | 3/2025 | Wu | G06N 3/045 |
| 2025/0103900 | A1 * | 3/2025 | Wu | G06N 3/045 |
| 2025/0103901 | A1 * | 3/2025 | Saravanos | G06N 3/098 |
| 2025/0111243 | A1 * | 4/2025 | Saravanos | G06N 3/045 |
| 2025/0111272 | A1 * | 4/2025 | Huang | G06N 20/00 |
| 2025/0139530 | A1 * | 5/2025 | Tschiatschek | G06F 21/57 |
| 2025/0165771 | A1 * | 5/2025 | Challa | G06N 3/047 |
| 2025/0165777 | A1 * | 5/2025 | Ranzinger | G06N 3/045 |
| 2025/0190847 | A1 * | 6/2025 | Ghazi | G06N 20/00 |
| 2025/0217508 | A1 * | 7/2025 | Cherubin | G06N 3/0985 |
| 2025/0252713 | A1 * | 8/2025 | Achille | G06V 10/761 |
| 2025/0258923 | A1 * | 8/2025 | Razinkov | G06F 21/577 |
| 2025/0292159 | A1 * | 9/2025 | Collado Umana | G06N 20/00 |
| 2025/0322256 | A1 * | 10/2025 | Zhou | G06N 3/084 |
| 2025/0348794 | A1 * | 11/2025 | Hsu | G06N 5/01 |
| 2025/0363418 | A1 * | 11/2025 | Choquette Choo | G06N 20/00 |
| 2026/0073276 | A1 * | 3/2026 | Hoffer | G06N 20/00 |
| 2026/0111576 | A1 * | 4/2026 | Wang | G06F 21/606 |

OTHER PUBLICATIONS

Paszke et al. PyTorch: An imperative style, high-performance deep learning library. In NeurIPS, pp. 8024-8035, 2019.

Rachel Cummings, Damien Desfontaines, David Evans, Roxana Geambasu, Matthew Jagielski, Yangsibo Huang, Peter Kairouz, Gautam Kamath, Sewoong Oh, Olga Ohrimenko, et al. Challenges towards the next frontier in privacy. arXiv preprint arXiv:2304.06929, 2023. 50 pages.

Raef Bassily, Adam Smith, and Abhradeep Thakurta. Private empirical risk minimization: Efficient algorithms and tight error bounds. In FOCS, pp. 464-473, 2014.

Rafael Muller, Simon Kornblith, and Geoffrey E Hinton. When does label smoothing help? In NeurIPS, 2019. 10 pages.

Ruoxi Wang, Bin Fu, Gang Fu, and MingliangWang. Deep & cross network for ad click predictions. In ADKDD, 2017. 7 pages.

Ruoxi Wang, Rakesh Shivanna, Derek Cheng, Sagar Jain, Dong Lin, Lichan Hong, and Ed Chi. DCN V2: Improved deep & cross network and practical lessons for web-scale learning to rank systems. In The Web Conference, 2021. 14 pages.

Salil Vadhan. The Complexity of Differential Privacy. Springer, 2017. 95 pages.

Sebastian Meiser and Esfandiar Mohammadi. Tight on budget? Tight bounds for r-fold approximate differential privacy. In CCS, pp. 247-264, 2018.

Sivakanth Gopi, Yin Tat Lee, and Lukas Wutschitz. Numerical composition of differential privacy. In NeurIPS, pp. 11631-11642, 2021.

Soham De, Leonard Berrada, Jamie Hayes, Samuel L Smith, and Borja Balle. Unlocking high-accuracy differentially private image classification through scale. arXiv preprint arXiv:2204.13650, 2022. 34 pages.

Stanley L Warner. Randomized response: A survey technique for eliminating evasive answer bias. JASA, 60 (309):63-69, 1965.

Tang et al. Machine Learning with Differentially Private Labels: Mechanisms and Frameworks. 2022. Proceedings on Privacy Enhancing Technologies. pp. 1-19.

Tarin Clanuwat, Mikel Bober-Irizar, Asanobu Kitamoto, Alex Lamb, Kazuaki Yamamoto, and David Ha. Deep learning for classical Japanese literature. arXiv preprint arXiv:1812.01718, 2018. 8 pages.

Ting Chen, Simon Kornblith, Kevin Swersky, Mohammad Norouzi, and Geoffrey E Hinton. Big selfsupervised models are strong semi-supervised learners. In NeurIPS, pp. 22243-22255, 2020b.

Ting Chen, Simon Kornblith, Mohammad Norouzi, and Geoffrey Hinton. A simple framework for contrastive learning of visual representations. In ICML, pp. 1597-1607, 2020a.

Vadym Doroshenko, Badih Ghazi, Pritish Kamath, Ravi Kumar, and Pasin Manurangsi. Connect the dots: Tighter discrete approximations of privacy loss distributions. PoPETS, (4):552-570, 2022.

Wang et al. Differential Privacy and Minimum-Variance Unbiased Estimation in Multi-agent Control Systems. Preprints of the 20th World Congress. The International Federation of Automatic Control. Toulouse, France, Jul. 9-14, 2017. 6 pages.

Weiran Wang and Miguel A Carreira-Perpin'an. Projection onto the probability simplex: An efficient algorithm with a simple proof, and an application. arXiv preprint arXiv:1309.1541, 2013. 5 pages.

Xingjun Ma, Hanxun Huang, Yisen Wang, Simone Romano, Sarah Erfani, and James Bailey. Normalized loss functions for deep learning with noisy labels. In ICML, pp. 6543-6553, 2020.

Xinyu Tang, Milad Nasr, Saeed Mahloujifar, Virat Shejwalkar, Liwei Song, Amir Houmansadr, and Prateek Mittal. Machine learning with differentially private labels: Mechanisms and frameworks. PoPETS, 4:332-350, 2022.

Xiong Zhou, Xianming Liu, Junjun Jiang, Xin Gao, and Xiangyang Ji. Asymmetric loss functions for learning with noisy labels. In ICML, pp. 12846-12856, 2021.

(56) References Cited

OTHER PUBLICATIONS

Xuechen Li, Florian Tramer, Percy Liang, and Tatsunori Hashimoto. Large language models can be strong differentially private learners. In ICLR, 2022. 31 pages.
Yann LeCun, Leon Bottou, Yoshua Bengio, and Patrick Haffner. Gradient-based learning applied to document recognition. Proceedings of the IEEE, 86(11):2278-2324, 1998.
Yuhan Liu, Ananda Theertha Suresh, Felix Xinnan X Yu, Sanjiv Kumar, and Michael Riley. Learning discrete distributions: user vs item-level privacy. In NeurIPS, pp. 20965-20976, 2020.
Yu-Xiang Wang, Borja Balle, and Shiva Kasiviswanathan. Subsampled R'enyi differential privacy and analytical moments accountant. arXiv preprint arXiv:1808.00087, 2018. 29 pages.
Zhenda Xie, Zheng Zhang, Yue Cao, Yutong Lin, Jianmin Bao, Zhuliang Yao, Qi Dai, and Han Hu. Simmim: A simple framework for masked image modeling. In CVPR, pp. 9653-9663, 2022.
A proposal for privacy preserving ad attribution measurement using Prio-like architecture. Aug. 27, 2023. https://github.com/patcg/proposals/issues/17. 3 pages.
Abadi et al. TensorFlow: Large-scale machine learning on heterogeneous systems, 2015. URL https://www.tensorflow.org/. 19 pages.
Alex Krizhevsky, Geoffrey Hinton, et al. Learning multiple layers of features from tiny images. Master's thesis, Department of Computer Science, University of Toronto, 2009. 60 pages.
Alexey Kurakin, Steve Chien, Shuang Song, Roxana Geambasu, Andreas Terzis, and Abhradeep Thakurta. Toward training at ImageNet scale with differential privacy. arXiv preprint arXiv:2201.12328, 2022. 25 pages.
Antti Koskela, Joonas Jalko, and Antti Honkela. Computing tight differential privacy guarantees using FFT. In AISTATS, pp. 2560-2569, 2020.
Aritra Ghosh, Himanshu Kumar, and P Shanti Sastry. Robust loss functions under label noise for deep neural networks. In AAAI, 2017. 7 pages.
Atilim Gunes Baydin, Barak A Pearlmutter, Alexey Andreyevich Radul, and Jeffrey Mark Siskind. Automatic differentiation in machine learning: a survey. JMLR, 18:1-43, 2018.
Badih Ghazi, Noah Golowich, Ravi Kumar, Pasin Manurangsi, and Chiyuan Zhang. Deep learning with label differential privacy. In NeurIPS, pp. 27131-27145, 2021.
Badih Ghazi, Pritish Kamath, Ravi Kumar, and Pasin Manurangsi. Faster privacy accounting via evolving discretization. In ICML, pp. 7470-7483, 2022.
Badih Ghazi, Pritish Kamath, Ravi Kumar, Ethan Leeman, Pasin Manurangsi, Avinash Varadarajan, and Chiyuan Zhang. Regression with label differential privacy. In ICLR, 2023. 28 pages.
Brendan McMahan, Eider Moore, Daniel Ramage, Seth Hampson, and Blaise Aguera y Arcas. Communication-efficient learning of deep networks from decentralized data. In AISTATS, pp. 1273-1282, 2017.
Busa-Fekete et al. Label Differential Privacy and Private Training Data Release. Proceedings of the 40th International Conference on Machine Learning, Honolulu, Hawaii, USA. Pmlr 202, 2023. 19 pages.
Carson Denison, Badih Ghazi, Pritish Kamath, Ravi Kumar, Pasin Manurangsi, Krishna Giri Narra, Amer Sinha, Avinash Varadarajan, and Chiyuan Zhang. Private ad modeling with DP-SGD. In AdKDD, 2023. 8 pages.
Covington et al. Unbiased Statistical Estimation and Valid Confidence Intervals Under Differential Privacy. Oct. 27, 2021. 44 pages.
Cynthia Dwork and Aaron Roth. The algorithmic foundations of differential privacy. Found. Trends Theor. Comput. Sci., 9(3-4):211-407, 2014. doi: 10.1561/0400000042. URL https://doi.org/10.1561/0400000042.
Cynthia Dwork, Frank McSherry, Kobbi Nissim, and Adam D. Smith. Calibrating noise to sensitivity in private data analysis. In TCC, pp. 265-284, 2006b.
Cynthia Dwork, Krishnaram Kenthapadi, Frank McSherry, Ilya Mironov, and Moni Naor. Our data, ourselves: Privacy via distributed noise generation. In Eurocrypt, pp. 486-503, 2006.
Da Yu, Saurabh Naik, Arturs Backurs, Sivakanth Gopi, Huseyin A Inan, Gautam Kamath, Janardhan Kulkarni, Yin Tat Lee, Andre Manoel, Lukas Wutschitz, et al. Differentially private fine-tuning of language models. In ICLR, 2022. 19 pages,.
Daniel Levy, Ziteng Sun, Kareem Amin, Satyen Kale, Alex Kulesza, Mehryar Mohri, and Ananda Theertha Suresh. Learning with user-level privacy. NeurIPS, 34:12466-12479, 2021.
David E Rumelhart, Geoffrey E Hinton, and Ronald J Williams. Learning representations by back-propagating errors. Nature, 323(6088):533-536, 1986.
David M Sommer, Sebastian Meiser, and Esfandiar Mohammadi. Privacy loss classes: The central limit theorem in differential privacy. PoPETS, (2):245-269, 2019.
Elad Hazan. Introduction to Online Convex Optimization. MIT Press, 2022. 260 pages.
Eustache Diemert, Meynet Julien, Pierre Galland, and Damien Lefortier. Attribution modeling increases efficiency of bidding in display advertising. In AdKDD, 2017. Under review as a conference paper at ICLR 2024. 16 pages.
Florian Tramer and Dan Boneh. Differentially private learning needs better features (or much more data). In ICLR, 2021. 25 pages.
Friedrich Dormann, Osvald Frisk, Lars Nørvang Andersen, and Christian Fischer Pedersen. Not all noise is accounted equally: How differentially private learning benefits from large sampling rates. In MLSP, 2021. 6 pages.
Ghazi et al. Deep Learning with Label Differential Privacy. Oct. 26, 2021. 29 pages.
Google's DP Library. DP Accounting Library. https://github.com/google/differential-privacy/tree/main/python/dp_accounting, 2020. 2 pages.
Guorui Zhou, Xiaoqiang Zhu, Chenru Song, Ying Fan, Han Zhu, Xiao Ma, Yanghui Yan, Junqi Jin, Han Li, and Kun Gai. Deep interest network for click-through rate prediction. In SIGKDD, 2018. 9 pages.
Han Xiao, Kashif Rasul, and Roland Vollgraf. Fashion-MNIST: a novel image dataset for benchmarking machine learning algorithms. arXiv preprint arXiv:1708.07747, 2017. 6 pages.
Heng-Tze Cheng, Levent Koc, Jeremiah Harmsen, Tal Shaked, Tushar Chandra, Hrishi Aradhye, Glen Anderson, Greg Corrado, Wei Chai, Mustafa Ispir, et al. Wide & deep learning for recommender systems. In 1st Workshop on Deep Learning for Recommender Systems, 2016. 4 pages.
Hossein Esfandiari, Vahab Mirrokni, Umar Syed, and Sergei Vassilvitskii. Label differential privacy via clustering. In AISTATS, pp. 7055-7075, 2022.
Huifeng Guo, Ruiming Tang, Yunming Ye, Zhenguo Li, and Xiuqiang He. DeepFM: a factorization-machine based neural network for CTR prediction. arXiv preprint arXiv:1703.04247, 2017. 8 pages.
Ilya Mironov. Renyi differential privacy. In CSF, pp. 263-275, 2017.
Jain et al. Differential privacy: its technological prescriptive using big data. J Big Data (2018) 5:15, 24 pages.
James Bradbury, Roy Frostig, Peter Hawkins, Matthew James Johnson, Chris Leary, Dougal Maclaurin, George Necula, Adam Paszke, Jake VanderPlas, Skye Wanderman-Milne, and Qiao Zhang. JAX: composable transformations of Python+NumPy programs, 2018. URL http://github.com/google/jax. 10 pages.
Jean-Bastien Grill, Florian Strub, Florent Altch'e, Corentin Tallec, Pierre Richemond, Elena Buchatskaya, Carl Doersch, Bernardo Avila Pires, Zhaohan Guo, Mohammad Gheshlaghi Azar, et al. Bootstrap your own latent—A new approach to self-supervised learning. In NeurIPS, pp. 21271-21284, 2020.
Kaiming He, Haoqi Fan, Yuxin Wu, Saining Xie, and Ross Girshick. Momentum contrast for unsupervised visual representation learning. In CVPR, pp. 9729-9738, 2020.
Kaiming He, Xiangyu Zhang, Shaoqing Ren, and Jian Sun. Deep residual learning for image recognition. In CVPR, pp. 770-778, 2016.
Kamalika Chaudhuri and Daniel Hsu. Sample complexity bounds for differentially private learning. In COLT, pp. 155-186, 2011.
Kamath et al. A Bias-Variance-Privacy Trilemma for Statistical Estimation. Mar. 1, 2023. 59 pages.
Kasiviswanathan et al. What Can We Learn Privately? Feb. 19, 2010. 35 pages.

(56) References Cited

OTHER PUBLICATIONS

Kihyuk Sohn, David Berthelot, Nicholas Carlini, Zizhao Zhang, Han Zhang, Colin A Raffel, Ekin Dogus Cubuk, Alexey Kurakin, and Chun-Liang Li. Fixmatch: Simplifying semi-supervised learning with consistency and confidence. In NeurIPS, pp. 596-608, 2020.
Mani Malek, Ilya Mironov, Karthik Prasad, Igor Shilov, and Florian Tramer. Antipodes of label differential privacy: Pate and Alibi. In NeurIPS, pp. 6934-6945, 2021.
Martin Abadi, Andy Chu, Ian Goodfellow, H Brendan McMahan, Ilya Mironov, Kunal Talwar, and Li Zhang. Deep learning with differential privacy. In CCS, pp. 308-318, 2016.
Martin Thomson. Privacy Preserving Attribution for Advertising, Feb. 2022. https://blog.mozilla.org/en/mozilla/privacy-preserving-attribution-for-advertising/. 7 pages.
Mathilde Caron, Hugo Touvron, Ishan Misra, Herv'e J'egou, Julien Mairal, Piotr Bojanowski, and Armand Joulin. Emerging properties in self-supervised vision transformers. In ICCV, pp. 9650-9660, 2021.
Maud Nalpas and Alexandra White. Attribution Reporting, May 2021. https://developer.chrome.com/en/docs/privacy-sandbox/attribution-reporting/. 17 pages.
Maxim Naumov, Dheevatsa Mudigere, Hao-Jun Michael Shi, Jianyu Huang, Narayanan Sundaraman, Jongsoo Park, Xiaodong Wang, Udit Gupta, Carole-Jean Wu, Alisson G Azzolini, et al. Deep learning recommendation model for personalization and recommendation systems. arXiv preprint arXiv:1906.00091, 2019. 10 pages.
Michal Lukasik, Srinadh Bhojanapalli, Aditya Menon, and Sanjiv Kumar. Does label smoothing mitigate label noise? In ICML, pp. 6448-6458, 2020.
Nicolas Papernot, Abhradeep Thakurta, Shuang Song, Steve Chien, and Ulfar Erlingsson. Tempered sigmoid activations for deep learning with differential privacy. In AAAI, 2021. 10 pages.

* cited by examiner

| Privacy Budget ($\varepsilon$) | Baseline LabelDP Methods | | | | DP-SGD | LabelDP-Pro | | |
|---|---|---|---|---|---|---|---|---|
| | RR | RR-DEBIASED | LP-2ST | ALIBI | | Acc. | $\Delta_{Baseline}$ | $\Delta_{DP\text{-}SGD}$ |
| MNIST-10 | | | | | | | | |
| 0.01 | 6.5 | 10.8 | 9.0 | 10.3 | 65.3 | **68.2** | 57.4 ↑ | 2.9 ↑ |
| 0.1 | 7.3 | 10.9 | 10.0 | 9.7 | 85.6 | **91.1** | 80.2 ↑ | 5.5 ↑ |
| 0.2 | 8.1 | 10.9 | 10.0 | 9.7 | 87.9 | **92.9** | 82.0 ↑ | 5.0 ↑ |
| 0.5 | 10.4 | 11.0 | 10.0 | 82.5 | 90.9 | **94.1** | 83.1 ↑ | 3.2 ↑ |
| 1.0 | 51.3 | 50.6 | 83.3 | 94.1 | 92.8 | **94.3** | 11.0 ↑ | 1.5 ↑ |
| 2.0 | 96.7 | **96.8** | **96.8** | 96.6 | 93.8 | 95.4 | 1.4 ↓ | 1.6 ↑ |
| CIFAR-10 | | | | | | | | |
| 0.05 | 10.0 | 10.0 | 10.0 | 9.9 | 10.1 | **16.0** | 6.0 ↑ | 5.9 ↑ |
| 0.1 | 10.0 | 10.0 | 10.0 | 9.9 | 24.6 | **27.0** | 17.0 ↑ | 2.4 ↑ |
| 0.2 | 10.0 | 10.0 | 10.0 | 17.9 | 29.8 | **30.8** | 12.9 ↑ | 1.0 ↑ |
| 0.5 | 10.0 | 10.0 | 35.8 | 34.4 | 36.9 | **40.2** | 5.8 ↑ | 3.3 ↑ |
| 1.0 | 17.0 | 10.0 | **60.9** | 51.3 | 43.5 | 44.8 | 16.1 ↓ | 1.3 ↑ |

FIG. 7

| $\varepsilon$ | Baseline LabelDP Methods | | | | DP-SGD | LabelDP-Pro | | |
|---|---|---|---|---|---|---|---|---|
| | RR | RR-Debiased | RRWithPrior | PATE-FM | | Acc. | $\Delta_{\text{Baseline}}$ | $\Delta_{\text{DP-SGD}}$ |
| **0.01** | 2.5 | 2.7 | 24.6 | - | 71.8 | **74.4** | 43.1 ↑ | 2.6 ↑ |
| **0.02** | 3.4 | 2.1 | 50.4 | - | 81.6 | **82.4** | 32.0 ↑ | 0.8 ↑ |
| **0.05** | 3.5 | 2.7 | 70.8 | - | 85.1 | **85.5** | 14.7 ↑ | 0.4 ↑ |
| **0.18** | 4.7 | 3.1 | 76.8 | 73.4 | 86.4 | **86.6** | 9.8 ↑ | 0.2 ↑ |
| **0.29** | 5.1 | 3.7 | 76.8 | 86.9 | 87.0 | **87.2** | 0.3 ↑ | 0.2 ↑ |
| **0.5** | 6.0 | 9.8 | 78.1 | - | 87.1 | **87.4** | 9.3 ↑ | 0.3 ↑ |
| **1.6** | 88.1 | 88.0 | 83.1 | **93.7** | 87.2 | 87.7 | 6.5 ↓ | 0.5 ↑ |

FIG. 8

| $\varepsilon$ | $k = 2$ | | | $k = 5$ | | | $k = 10$ | | |
|---|---|---|---|---|---|---|---|---|---|
| | RR | DP-SGD | LabelDP-Pro | RR | DP-SGD | LabelDP-Pro | RR | DP-SGD | LabelDP-Pro |
| **0.1** | 0.562 | 0.686 | **0.780** | 0.537 | 0.668 | **0.768** | 0.544 | 0.652 | **0.751** |
| **0.2** | 0.594 | 0.707 | **0.786** | 0.549 | 0.693 | **0.771** | 0.555 | 0.680 | **0.766** |
| **0.5** | 0.652 | 0.719 | **0.787** | 0.587 | 0.714 | **0.776** | 0.575 | 0.704 | **0.766** |
| **1.0** | 0.710 | 0.724 | **0.789** | 0.638 | 0.722 | **0.777** | 0.605 | 0.712 | **0.768** |
| **2.0** | 0.761 | 0.731 | **0.791** | 0.704 | 0.728 | **0.778** | 0.652 | 0.720 | **0.769** |
| **5.0** | **0.804** | 0.741 | 0.793 | 0.761 | 0.739 | **0.781** | 0.718 | 0.733 | **0.773** |
| $\infty$ | 0.823 | | | 0.824 | | | 0.824 | | |

FIG. 9

LEARNING WITH LABEL DIFFERENTIAL PRIVACY VIA PROJECTIONS

BACKGROUND

Differential privacy frameworks introduce calibrated noise into machine learning pipelines to safeguard the privacy of user data. Differential privacy is widely used in private machine learning applications, aiming to protect both the features and labels of the training examples when training machine learning models. However, protecting both features and labels can be excessive in domains where the sensitivity lies solely in the labels of the training examples, such as digital content management like online advertising. In the online advertising domain for example, the primary objective is to predict whether a user will perform a useful action on an advertiser website, e.g., purchase an advertised product, after interacting with an advertisement on a publisher website, e.g., clicking the advertisement. This task can inherently involve private labels, but not necessarily private features, as the prediction can be made based on features generally considered non-private, such as the product description associated with the advertisement.

Label differential privacy captures such domains by leveraging the standard definition of differential privacy to only protect the privacy of the labels. Label differential privacy can rely on randomized response, where each label is randomly changed to a potentially different label according to a predetermined probability distribution. The training is then conducted with the randomized labels.

Differential privacy can be governed by a privacy parameter E, where smaller values of the privacy parameter, e.g., less than 1, can indicate a higher-privacy regime. However, in higher-privacy regimes, such as digital content management, signal-to-noise ratio may be extremely low in the randomized labels generated by randomized response, resulting in lower performance, e.g., accuracy, of the machine learning models trained in this manner. While stochastic gradient descent for differential privacy can exhibit higher signal-to-noise ratios compared to randomized response, stochastic gradient descent applies differential privacy to both features and labels, resulting in higher cost when training the machine learning models due to randomizing features that may not need to be privatized.

BRIEF SUMMARY

Aspects of the disclosure are directed to implementing a projection-based stochastic gradient descent technique that maintains label differential privacy when training one or more machine learning models. The technique includes denoising gradients by exploiting projections when training the machine learning models to improve performance of the trained machine learning models while maintaining label differential privacy. For instance, the projection-based stochastic gradient descent technique can improve performance of machine learning models in higher-privacy regimes, such as digital content management.

An aspect of the disclosure provides for a method for training a machine learning model with differentially private labels including: receiving, by one or more processors, a training dataset and plurality of model weights; computing, by the one or more processors, a plurality of gradients from the training dataset and plurality of model weights based on one or more parameters for training the machine learning model; aggregating, by the one or more processors, the plurality of gradients and adding, by the one or more processors, noise to the plurality of gradients based on a privacy parameter to generate a noisy aggregated gradient; denoising, by the one or more processors, the noisy aggregated gradient via projecting to generate a projection-based gradient; and updating, by the one or more processors, the plurality of model weights to generate a plurality of updated model weights based on the projection-based gradient. Another aspect of the disclosure provides for a system including one or more processors; and one or more storage devices coupled to the one or more processors and storing instructions that, when executed by the one or more processors, cause the one or more processors to perform operations for the method for training a machine learning model with differentially private labels. Yet another aspects of the disclosure provides for a non-transitory computer readable medium for storing instructions that, when executed by one or more processors, cause the one or more processors to perform operations for the method for training a machine learning model with differentially private labels.

In an example, the one or more parameters include at least one of learning rate, number of training iterations, batch size, noise multiplier, or gradient norm bound. In another example, the privacy parameter is below a threshold value indicating a high privacy domain.

In yet another example, the method further includes clipping, by the one or more processors, the plurality of gradients.

In yet another example, the method further includes iteratively performing the computing, aggregating, denoising, and updating for a number of training iterations. In yet another example, the method further includes outputting, by the one or more processors, a trained machine learning model with trained model weights after performing the number of training iterations.

In yet another example, denoising the noisy aggregated gradient further includes projecting the noisy aggregated gradient onto a span of per-example per-class gradients. In yet another example, denoising the noisy aggregated gradient further includes projecting the noisy aggregated gradient onto a convex hull of per-example per-class gradients. In yet another example, denoising the noisy aggregated gradient further includes projecting the noisy aggregated gradient onto a convex hull of per-example per-class gradients based on a random batch of examples generated from the training dataset.

In yet another example, denoising the noisy aggregated gradient further includes performing auto-differentiation. In yet another example, performing auto-differentiation further includes performing forward mode auto-differentiation to cumulatively compute a Jacobian-vector product of the projection-based gradient. In yet another example, performing auto-differentiation further includes performing reverse mode auto-differentiation to cumulatively compute a vector-Jacobian product of the projection-based gradient.

In yet another example, denoising the noisy aggregated gradient further includes smoothing a projection coefficient of the projection-based gradient using regularization.

BRIEF DESCRIPTION OF THE DRAWINGS

FIG. 7 depicts a table evaluating an example projection-based training system according to aspects of the disclosure.

FIG. 8 depicts a table evaluating an example projection-based training system implementing self-supervised learning techniques according to aspects of the disclosure.

FIG. 9 depicts a table evaluating an example projection-based training system with user-level privacy according to aspects of the disclosure.

DETAILED DESCRIPTION

Figure 1:
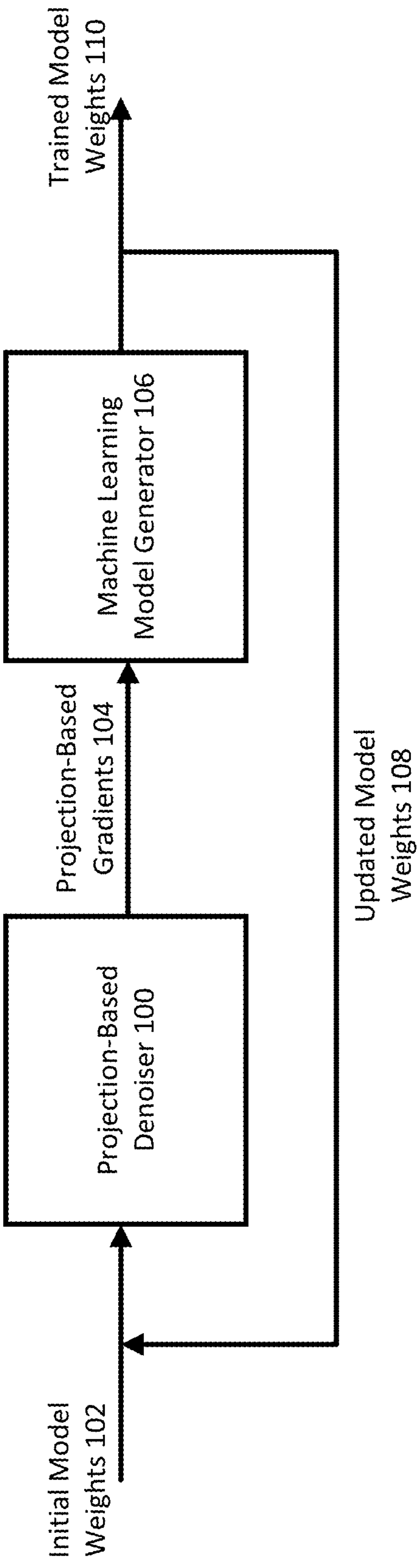
FIG. 1 depicts a block diagram of an example projection-based denoiser according to aspects of the disclosure.

The technology relates generally to training one or more machine learning models using label differential privacy that interleaves gradient projections with private stochastic gradient descent. Training the machine learning models in this manner improves upon state-of-the-art label differential privacy, particularly in a high privacy domain. As an example, the labels can be conversion labels, which indicate whether an action, e.g., a purchase of an item, was completed or not in response to interacting with digital content, e.g., clicking on an advertisement for the item. The machine learning models can be regression models implementing squared loss or Poisson log loss objectives, as examples.

The training process includes receiving initial model weights and a training dataset for training the machine learning model. The training dataset can include features and labels. As an example, the training dataset can include conversion labels indicating whether an action was completed or not in response to interacting with digital content. The training process also receives a denoiser for denoising gradients calculated during training iterations of the training process. The training process can further include receiving one or more parameters for adjusting the training of the machine learning model, such as learning rate, number of training iterations, batch size, noise multiplier based on a privacy parameter, gradient norm bound. For the high privacy domain, the privacy parameter can be below a threshold value, e.g., less than 1. The training process can output a trained machine learning model with trained model weights, such as after the number of training iterations indicated in the one or more parameters.

A training iteration can include computing a plurality of gradients from the initial model weights and training dataset based on the one or more parameters. The training iteration can further include clipping each of the plurality of gradients for ensuring differential privacy, so that noise to be added is sufficient to mask the contribution of any individual gradient. The training iteration can also include aggregating the plurality of gradients and adding noise based on the privacy parameter to generate a noisy aggregated gradient. The training iteration then includes denoising the noisy aggregated gradient using the denoiser to generate a projection-based gradient representing a denoised aggregated gradient. The training iteration further includes updating the initial model weights to generate updated model weights based on the projection-based gradient to improve performance of the machine learning model.

The denoiser can denoise the noisy aggregated gradient using structural priors computed based on input features of the training dataset. Example denoisers can include a self-span denoiser, a self-conv denoiser, and/or an alt-conv denoiser.

The self-span denoiser can exploit that the plurality of gradients lies in the span of per-example per-class gradients, allowing for denoising the noisy aggregated gradient by projecting onto this span. Per-example, per-class gradients may refer to a set of all gradients corresponding to all possible values of labels for each example, e.g., collection of features and corresponding label, in a batch. The span can be constructed using only features and without accessing the labels, e.g., the conversion labels. The self-conv and alt-conv denoisers can exploit that the plurality of gradients lies in the convex hull of the per-example per-class gradients, allowing for denoising the noisy aggregated gradient by projecting onto this convex hull. For the alt-conv denoiser, a random batch of examples, e.g., random batch of features and labels from the training dataset, can be generated from the training dataset, where the denoiser can project onto the convex hull of the per-example per-class gradients based on the random batch of examples. The alt-conv denoiser can further allow for amplification by subsampling, resulting in a lower privacy cost.

The memory required to store a projection matrix representing the projection-based gradient generated by the denoiser can be reduced through auto-differentiation. The denoiser can implement forward mode auto-differentiation to cumulatively compute the Jacobian-vector product of the projection matrix in a forward manner starting from the bottom, e.g., input layer, of the machine learning model without requiring a materialization of the projection matrix. Similarly, the denoiser can implement reverse mode auto-differentiation to compute the vector-Jacobian product of the projection matrix in a backward manner starting from the top, e.g., output layer, of the machine learning model, without requiring a materialization of the projection matrix. This can result in significant memory reduction when utilizing the denoisers, as the projection matrix does not need to be stored.

The projection-based gradient generated by the denoiser can include a projection coefficient. The training iterations can further include smoothing the projection coefficient through regularization to improve stability in the training process, resulting in improved performance of the trained machine learning model. As an example, a projection coefficient can be smoothed through the following equation: $\tilde{\alpha}=\lambda\alpha+(1-\lambda)\beta$. $\beta$ is a constant vector with each coordinate representing a uniform distribution that assigns equal weights to all projection vertices. $\lambda$ is a configurable value to control the level of regularization, with smaller values indicating stronger regularization. For instance, $\lambda$ can be less than 1, such as 0.75, to enable a more stable training process and improve performance.

FIG. 1 depicts a block diagram of an example projection-based denoiser 100. The projection-based denoiser 100 can receive an aggregated gradient based on a machine learning model with initial model weights 102 and denoise the aggregated gradient to generate a projection-based gradient 104. The projection-based denoiser 100 can be a self-span denoiser, a self-conv denoiser, and/or an alt-conv denoiser, as examples. A machine learning model generator 106 can receive the projection-based gradient 104 and update the initial model weights 102 based on the projection-based gradient 104 to generate a machine learning model with updated model weights 108. The projection-based denoiser 100 can receive an updated aggregated gradient based on the machine learning model with updated model weights 108. The projection-based denoiser 100 and machine learning model generator 106 can respectively generate projection-based gradients 104 and machine learning models with updated model weights 108 for a number of training iterations. After the number of training iterations, the machine learning model generator 106 can generate a trained machine learning model with trained model weights 110.

Figure 2:
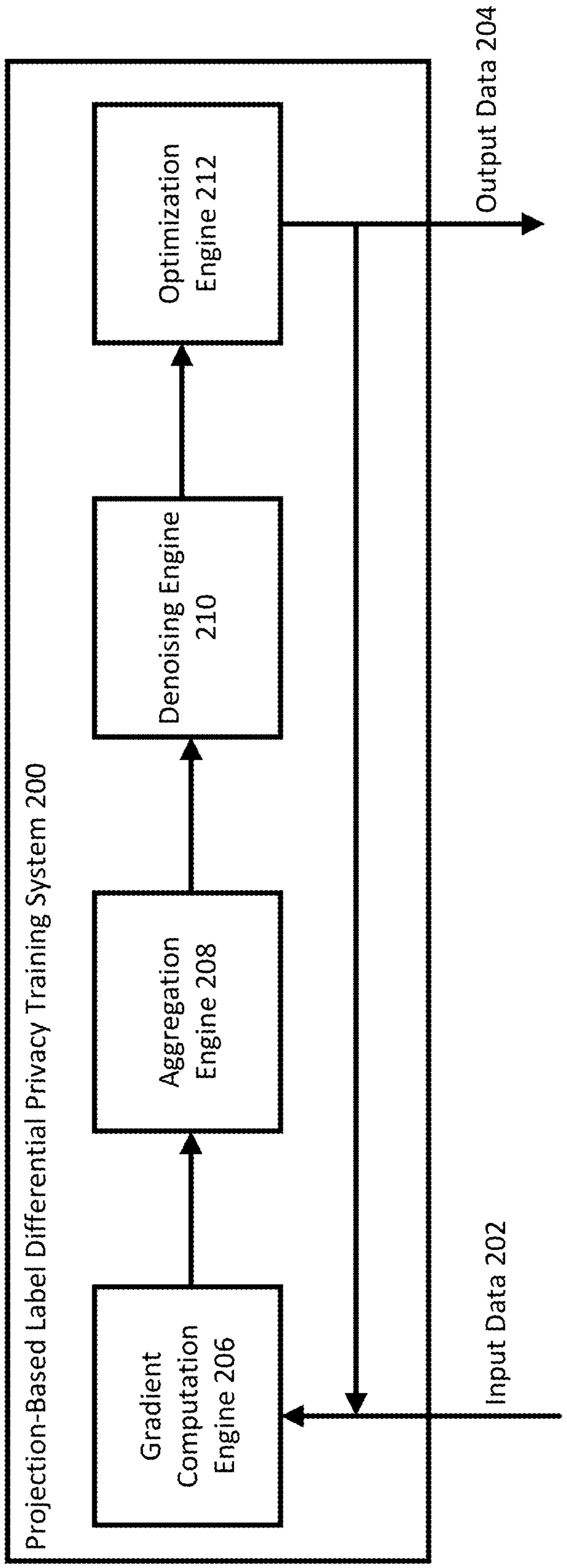
FIG. 2 depicts a block diagram of a projection-based label differential privacy training system for training machine learning models with differentially private labels according to aspects of the disclosure.

FIG. 2 depicts a block diagram of a projection-based label differential privacy training system 200 for training machine learning models with differentially private labels. The projection-based training system 200 can be implemented on one or more computing devices in one or more locations.

The projection-based training system 200 can be configured to receive input data 202. For example, the projection-based training system 200 can receive the input data 202 as part of a call to an application programming interface (API) exposing the projection-based training system 200 to one or more computing devices. The input data 202 can also be provided to the projection-based training system 200 through a storage medium, such as remote storage connected to the one or more computing devices over a network. The input data 202 can further be provided as input through a user interface on a client computing device coupled to the projection-based training system 200.

The input data 202 can include training data for training a machine learning model having initial model weights $\theta_0$. The input data 202 can further include one or more parameters for training the machine learning model, including learning rate $\eta_t$, number of training iterations T, batch size $n_1$, noise multiplier $\sigma$, gradient norm bound C, and/or denoiser type. The noise multiplier can be associated with a privacy parameter $\varepsilon$. The input data 202 can be associated with any machine learning task, such as predicting conversions for digital content or other digital content management. The training data can correspond to a training set D of size n, including n examples of features and corresponding labels. The training data can be split into a training set, a validation set, and/or a testing set. An example training/validation/testing split can be an 80/10/10 split, although any other split may be possible.

As an example, supervised learning can produce a model as output based on a labeled training set serving as the input data 202. Two training datasets are considered adjacent if they differ on a single training example. This notion of adjacency can protect the privacy of both features and the label of any individual example. In some scenarios, protecting the features may be unnecessary or infeasible, and the focus can be on protecting the privacy of the labels. Here, training can be label differentially private when two training datasets differ on the label of a single training example. For label differential privacy and standard differential privacy, a higher privacy regime can correspond to a smaller privacy parameter $\varepsilon$, such as $\varepsilon<1$.

In item-level or example-level privacy, differential privacy can protect the privacy of each training example, where each user may have contributed only one training example. In user-level privacy, differential privacy can protect the privacy of all examples contributed by a user, as a single user may contribute multiple training examples. With user-level privacy, the adjacent dataset can differ on all examples from a single user. User-level privacy may be relevant to domains like digital content management or federated learning, where each user may contribute multiple examples for training the machine learning models.

From the input data 202, the projection-based training system 200 can be configured to output one or more results generated as output data 204. The output data 204 can include a trained machine learning model with trained model weights $\theta_T$. As an example, the projection-based training system 200 can be configured to send the output data 204 for display on a client or user display. As another example, the projection-based training system 200 can be configured to provide the output data 204 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The projection-based training system 200 can further be configured to forward the output data 204 to one or more other devices configured for translating the output data into an executable program written in a computer programming language. The projection-based training system 200 can also be configured to send the output data 204 to a storage device for storage and later retrieval.

The projection-based training system 200 can include a gradient computation engine 206, an aggregation engine 208, a denoising engine 210, and an optimization engine 212. The gradient computation engine 206, aggregation engine 208, denoising engine 210, and optimization engine 212 can be implemented as one or more computer programs, specially configured electronic circuitry, or any combination thereof. The gradient computation engine 206, aggregation engine 208, denoising engine 210, and optimization engine 212 can perform training iterations to update the model weights.

For the initial training iteration, the gradient computation engine 206 can be configured to generate a plurality of gradients from the initial model weights and training dataset based on the one or more parameters. For subsequent training iterations, the gradient computation engine 206 can be configured to generate a plurality of gradients from the updated model weights and training dataset based on the batch size. For example, the gradient computation engine 206 can generate a mini-batch $$I_t^G$$

of $n_1$ indices by uniform sampling from [n]. For each example $$i \in I_t^G,\ g_t(x_i, y_i) \leftarrow \nabla_{\theta_t} l(\theta_t, (x_i, y_i)).$$

The gradient computation engine 206 can further be configured to clip each of the plurality of gradients based on the gradient norm bound for ensuring the contribution of any individual gradient is sufficiently masked. For example, for each example $$i \in I_t^G,\ \bar{g}_t(x_i, y_i) \leftarrow g_t(x_i, y_i)/\max\left(1, \frac{\|g_t(x_i, y_i)\|_2}{c}\right).$$

The aggregation engine 208 can be configured to generate a noisy aggregated gradient from the plurality of gradients based on the noise multiplier, gradient norm bound, and/or batch size. The aggregation engine 208 can be configured to sum the plurality of gradients and add noise to generate the noisy aggregated gradient. For example, $$\tilde{g}_t \leftarrow \frac{1}{n_1}\left(\sum\nolimits_{i \in I_t^G} \bar{g}_t(x_i, y_i) + N(0, \sigma^2 C^2 I)\right).$$

The denoising engine 210 can be configured to generate a denoised projection-based gradient from the noisy aggregated gradient based on the type of denoiser. For example $$\hat{g}_t \leftarrow Denoiser\left(\tilde{g}_t, \theta_t, \{x_i\}_{i \in I_t^G}\right).$$

The denoising engine 210 can denoise the noisy aggregated gradient based on structural prior distributions computed from features of the training dataset. The denoising engine 210 can allow for utilizing features without accessing labels to thus maintain label differential privacy. Example denoisers can include a self-span denoiser, a self-conv denoiser, and/or an alt-conv denoiser.

The denoising engine 210 can implement the self-span denoiser to denoise the noisy aggregated gradient by projecting onto the span of per-example per-class gradients. For example, $$Proj_{SelfSpan}(\tilde{g}_t) \text{ for } SelfSpan = span\left(\{\nabla_{\theta_t} l(\theta_t, (x_i, k)\}_{i \in I_t^G, k \in [K]}\right).$$

The span of per-example per-class gradients only involves features and thus does not need to access labels. The denoising engine 210 can alternatively or additionally implement the self-conv denoiser to denoise the noisy aggregated gradient by projecting onto the convex hull of the per-example per-class gradients. For example, $$Proj_{SelfConv}(\tilde{g}_t) \text{ for } SelfConv = conv\left(\{\nabla_{\theta_t} l(\theta_t, (x_i, k)\}_{i \in I_t^G, k \in [K]}\right).$$

The convex hull of per-example per-class gradients also only involves features.

The denoising engine 210 can also alternatively or additionally implement the alt-conv denoiser to denoise the noisy aggregated gradient by projecting onto the convex hull of per-example per-class gradients from an independently sampled alternative batch $$I_t^P$$

of $n_2$ examples from the training set D. For example, $$Proj_{AltConv}(\tilde{g}_t) \text{ for } AltConv = conv\left(\{\nabla_{\theta_t} l(\theta_t, (x_i, k)\}_{i \in I_t^P, k \in [K]}\right).$$

The alt-conv denoiser can further allow for amplification by subsampling, resulting in a lower privacy cost. Amplification by subsampling may refer to increasing differential privacy guarantees based on a random subsample of the training set. For example, the gradient computation engine 206 can apply amplification by subsampling by sampling each mini-batch of the training set uniformly and randomly. The privacy cost can be lower based on each example only contributing to the gradient when it is sampled in the mini-batch.

The denoisers can operate by projecting the noisy aggregated gradient onto the subspace or convex hull spanned by a set of per-example per-class gradients. Such a projection matrix may need a large amount of memory, e.g., $n_2Kd$ memory, to store the vertices spanning the convex hull, where d is the model size. However, denoiser engine 210 can reduce the memory for storing the projection matrix through auto-differentiation. To project the noisy aggregated gradient onto the convex hull of the columns of the projection matrix, the denoiser engine 210 can solve an optimization problem with projective gradient descent, such as solving $\min_{\alpha \in \Delta}\|G\alpha - \tilde{g}\|^2$. Here, G is the $d \times n_2K$ or $d \times n_1K$ projection matrix and $\Delta$ is the unit simplex for $n_2K$ or $n_1K$-dimension vectors.

For solving the optimization problem, the denoiser engine 210 can iteratively update $\alpha_{t+1} \leftarrow Proj_\Delta(\alpha_t - 2\eta^{PGD} G^T(G\alpha_t - \tilde{g}))$, where $\eta^{PGD}$ is the step size. The denoiser engine 210 can compute $G^T(G\alpha_t - \tilde{g})$ using $u \rightarrow Gu$ for any $u \in R^{n_2K}$ or $u \in R^{n_1K}$ as well as using $v \rightarrow G^TV$ for any $v \in R^d$. The denoiser engine 210 can perform these computations using auto differentiation primitives without materializing G, given that $G^T$ is the Jacobian of L, where $L:\theta \rightarrow [l(\theta, (x_i, k))]_{i \in [n_2], k \in [K]}$ or $L:\theta \rightarrow [l(\theta, (x_i, k))]_{i \in [n_1], k \in [K]}$. As such, $G^Tv$ is the Jacobian-vector product and Gu is the vector-Jacobian product. The denoiser engine 210 can implement forward mode auto-differentiation by cumulatively computing the Jacobian-vector product of the projection matrix starting from the input layer of the machine learning model. Alternatively, or additionally, the denoiser engine 210 can implement reverse mode auto-differentiation by cumulatively computing the vector-Jacobian product of the projection matrix starting from the output layer of the machine learning model. The denoiser engine 210 implementing auto-differentiation can result in significant memory reduction when denoising the noisy aggregated gradient.

The denoising engine 210 can further be configured to smooth a projection coefficient in the projection-based gradient generated by the denoiser. The denoising engine 210 can smooth the projection coefficient through regularization. For example, the denoising engine 210 can smooth the projection coefficient $\alpha$ to generate a smoothed projection coefficient $\tilde{\alpha}$ by solving $\tilde{\alpha} = \lambda\alpha + (1-\lambda)\beta$, where $\beta \in R^{n_2K}$ or $\beta \in R^{n_1K}$ is a constant vector with each coordinate being $$\frac{1}{K \times n_2} \text{ or } \frac{1}{K \times n_1},$$

representing a uniform distribution that assigns equal weights to all projection vertices. $\lambda$ is a configurable value to control the level of regularization, with smaller values indicating stronger regularization. For instance, $\lambda$ can be less than 1, such as 0.75, to enable a more stable training process and improve performance. Smoothing the projection coefficient can improve stability when training the machine learning model, resulting in improved performance for the trained machine learning model.

For the initial and subsequent training iterations, the optimization engine 212 can be configured to generate updated model weights from the initial or previously updated model weights based on the projection-based gradient and learning rate. For the final training iteration, the optimization engine 212 can be configured generate trained model weight from updated model weights based on the projection-based gradient and learning rate. For example, the optimization engine 212 can compute $\theta_{t+1} \leftarrow \theta_t - \eta_t \hat{g}_t$. The optimization engine 212 can send the updated weights back to the gradient computation engine 206 and can output the trained weights as output data 204.

Figure 3:
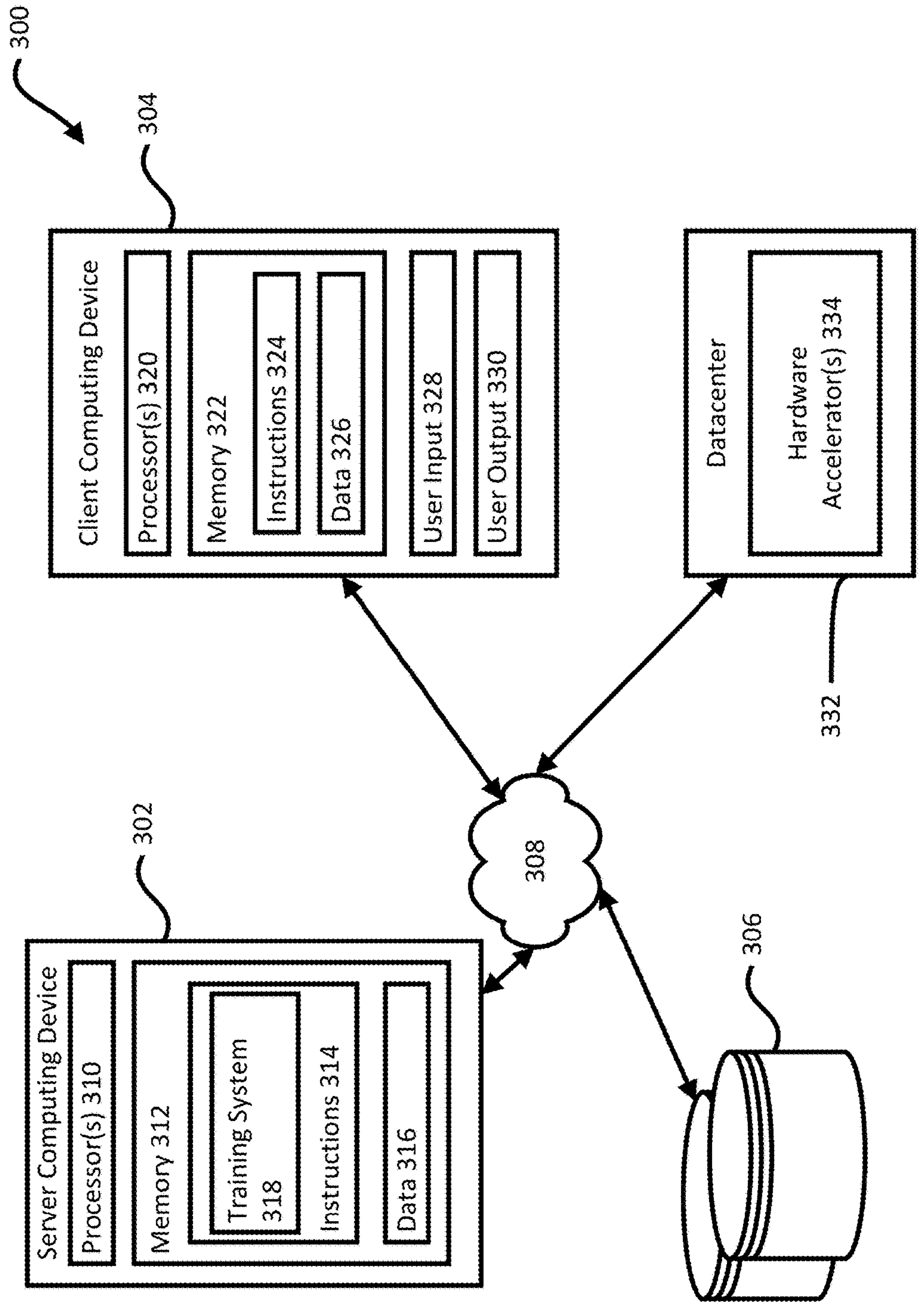
FIG. 3 depicts a block diagram of an example environment for implementing a projection-based training system according to aspects of the disclosure.

FIG. 3 depicts a block diagram of an example environment 300 for implementing a projection-based training system 318. The projection-based training system 318 can be implemented on one or more devices having one or more processors in one or more locations, such as in server computing device 302. Client computing device 304 and the server computing device 302 can be communicatively coupled to one or more storage devices 306 over a network 308. The storage devices 306 can be a combination of volatile and non-volatile memory and can be at the same or different physical locations than the computing devices 302, 304. For example, the storage devices 306 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 302 can include one or more processors 310 and memory 312. The memory 312 can store information accessible by the processors 310, including instructions 314 that can be executed by the processors 310. The memory 312 can also include data 316 that can be retrieved, manipulated, or stored by the processors 310. The memory 312 can be a type of transitory or non-transitory computer readable medium capable of storing information accessible by the processors 310, such as volatile and non-volatile memory. The processors 310 can include one or more central processing units (CPUs), graphic processing units (GPUs), field-programmable gate arrays (FPGAs), and/or application-specific integrated circuits (ASICs), such as tensor processing units (TPUs).

The instructions 314 can include one or more instructions that, when executed by the processors 310, cause the one or more processors 310 to perform actions defined by the instructions 314. The instructions 314 can be stored in object code format for direct processing by the processors 310, or in other formats including interpretable scripts or collections of independent source code modules that are interpreted on demand or compiled in advance. The instructions 314 can include instructions for implementing a projection-based training system 318, which can correspond to the projection-based training system 200 as depicted in FIG. 2. The projection-based training system 318 can be executed using the processors 310, and/or using other processors remotely located from the server computing device 302.

The data 316 can be retrieved, stored, or modified by the processors 310 in accordance with the instructions 314. The data 316 can be stored in computer registers, in a relational or non-relational database as a table having a plurality of different fields and records, or as JSON, YAML, proto, or XML documents. The data 316 can also be formatted in a computer-readable format such as, but not limited to, binary values, ASCII, or Unicode. Moreover, the data 316 can include information sufficient to identify relevant information, such as numbers, descriptive text, proprietary codes, pointers, references to data stored in other memories, including other network locations, or information that is used by a function to calculate relevant data.

The client computing device 304 can also be configured similarly to the server computing device 302, with one or more processors 320, memory 322, instructions 324, and data 326. The client computing device 304 can also include a user input 328 and a user output 330. The user input 328 can include any appropriate mechanism or technique for receiving input from a user, such as keyboard, mouse, mechanical actuators, soft actuators, touchscreens, microphones, and sensors.

The server computing device 302 can be configured to transmit data to the client computing device 304, and the client computing device 304 can be configured to display at least a portion of the received data on a display implemented as part of the user output 330. The user output 330 can also be used for displaying an interface between the client computing device 304 and the server computing device 302. The user output 330 can alternatively or additionally include one or more speakers, transducers or other audio outputs, a haptic interface or other tactile feedback that provides non-visual and non-audible information to the platform user of the client computing device 304.

Although FIG. 3 illustrates the processors 310, 320 and the memories 312, 322 as being within the respective computing devices 302, 304, components described herein can include multiple processors and memories that can operate in different physical locations and not within the same computing device. For example, some of the instructions 314, 324 and the data 316, 326 can be stored on a removable SD card and others within a read-only computer chip. Some or all of the instructions 314, 324 and data 316, 326 can be stored in a location physically remote from, yet still accessible by, the processors 310, 320. Similarly, the processors 310, 320 can include a collection of processors that can perform concurrent and/or sequential operation. The computing devices 302, 304 can each include one or more internal clocks providing timing information, which can be used for time measurement for operations and programs run by the computing devices 302, 304.

The server computing device 302 can be connected over the network 308 to a data center 332 housing any number of hardware accelerators 334. The data center 332 can be one of multiple data centers or other facilities in which various types of computing devices, such as hardware accelerators, are located. Computing resources housed in the data center 332 can be specified for deploying models, such as for conversion prediction or other digital content management, as described herein.

The server computing device 302 can be configured to receive requests to process data from the client computing device 304 on computing resources in the data center 332. For example, the environment 300 can be part of a computing platform configured to provide a variety of services to users, through various user interfaces and/or application programming interfaces (APIs) exposing the platform services. As an example, the variety of services can include predicting conversions from digital content interaction, e.g., whether a purchase of an item or service was completed or not in response to clicking on an advertisement associated with the item or service. The client computing device 304 can transmit input data as part of a query for a particular task. The projection-based training system 318 can receive the input data, and in response, generate output data including a response to the query for the particular task.

The server computing device 302 can maintain a variety of models in accordance with different constraints available at the data center 332. For example, the server computing device 302 can maintain different families for deploying models on various types of TPUs and/or GPUs housed in the data center 332 or otherwise available for processing.

Figure 4:
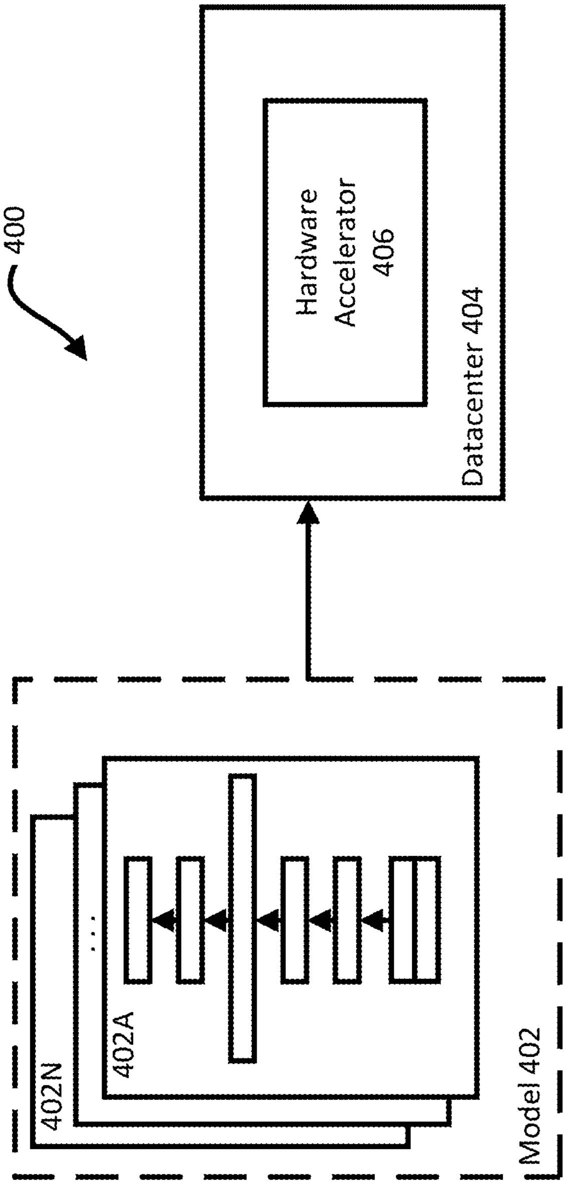
FIG. 4 depicts a block diagram illustrating one or more machine learning model architectures according to aspects of the disclosure.

FIG. 4 depicts a block diagram 400 illustrating one or more machine learning model architectures 402, more specifically 402A-N for each architecture, for deployment in a datacenter 404 housing a hardware accelerator 406 on which the deployed machine learning models 402 will execute, such as for the variety of services as described herein. The hardware accelerator 406 can be any type of processor, such as a CPU, GPU, FPGA, or ASIC such as a TPU.

An architecture 402 of a machine learning model can refer to characteristics defining the model, such as characteristics of layers for the model, how the layers process input, or how the layers interact with one another. The architecture 402 of the machine learning model can also define types of operations performed within each layer. One or more machine learning model architectures 402 can be generated that can output results, such as for conversion prediction of digital content. Example model architectures 402 can correspond to regression models, such as neural networks.

The machine learning models can be trained according to a variety of different learning techniques. Learning techniques for training the machine learning models can include supervised learning, unsupervised learning, semi-supervised learning, and reinforcement learning techniques. For example, training data can include multiple training examples that can be received as input by the machine learning models. The training examples can be labeled with a desired output for the model when processing the labeled training examples. The training examples can be labeled with noisy labels that guarantee label differential privacy. The noisy labels and the model output can be evaluated through a loss function to determine an error, which can be back propagated through the machine learning model to update weights for the model.

For example, a supervised learning technique can be applied to calculate an error between outputs, with a ground-truth label of a training example processed by the machine learning models. Any of a variety of loss or error functions appropriate for the type of the task the model is being trained for can be utilized, such as cross-entropy loss for classification tasks, or Poisson log loss or squared loss for regression tasks. The gradient of the error with respect to the different weights of the candidate model on candidate hardware can be calculated, for example using a backpropagation algorithm, and the weights for the model can be updated.

Referring back to FIG. 3, the devices 302, 304 and the data center 332 can be capable of direct and indirect communication over the network 308. For example, using a network socket, the client computing device 304 can connect to a service operating in the data center 332 through an Internet protocol. The devices 302, 304 can set up listening sockets that may accept an initiating connection for sending and receiving information. The network 308 can include various configurations and protocols including the Internet, World Wide Web, intranets, virtual private networks, wide area networks, local networks, and private networks using communication protocols proprietary to one or more companies. The network 308 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 308, in addition or alternatively, can also support wired connections between the devices 302, 304 and the data center 332, including over various types of Ethernet connection.

Although a single server computing device 302, client computing device 304, and data center 332 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing machine learning models, or any combination thereof.

Figure 5:
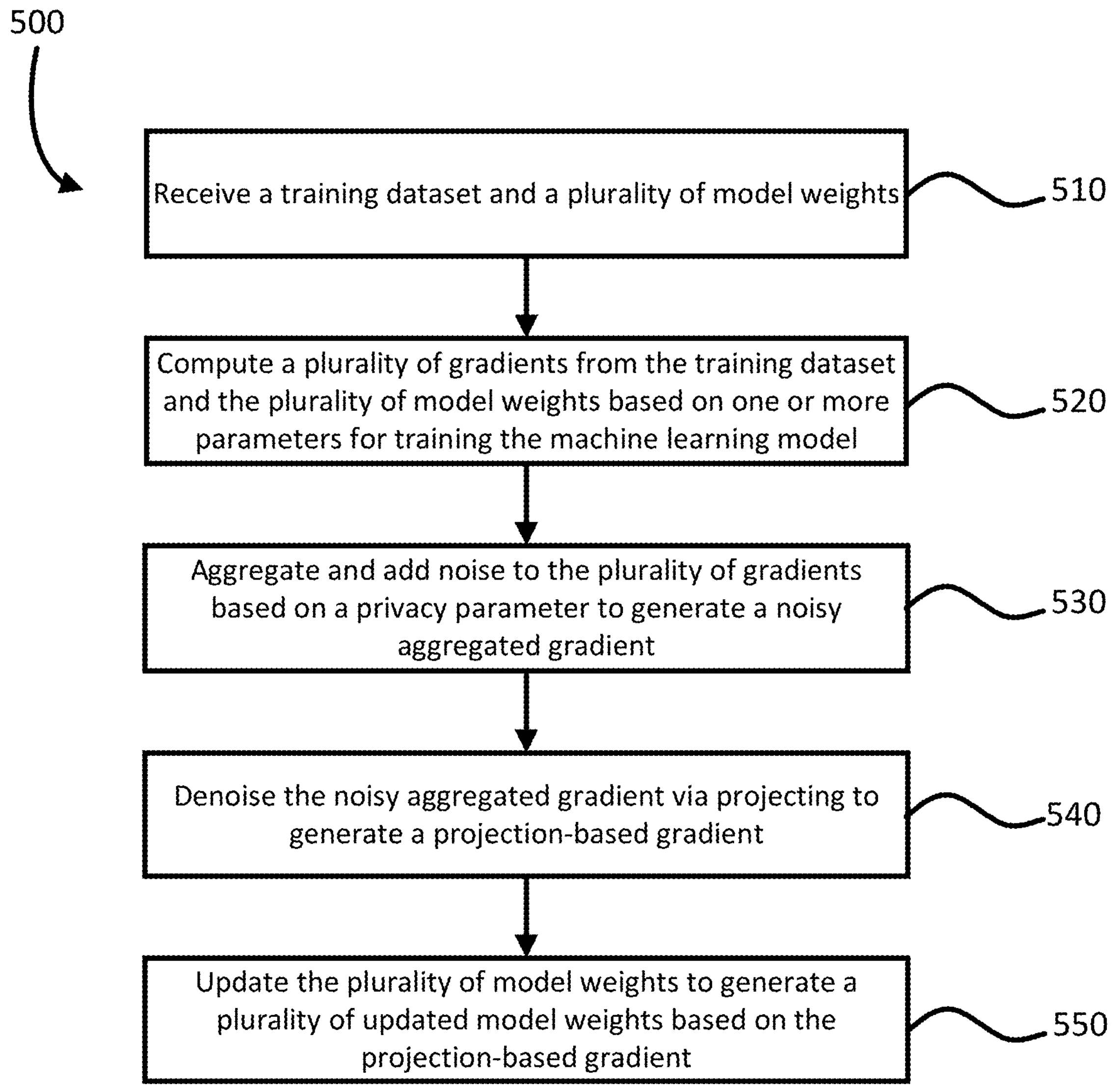
FIG. 5 depicts a flow diagram of an example process for an iteration of training one or more machine learning models using differentially private labels according to aspects of the disclosure.

FIG. 5 depicts a flow diagram of an example process 500 for an iteration of training one or more machine learning models using differentially private labels. The example process can be performed on a system of one or more processors in one or more locations, such as the projection-based training system 200 as depicted in FIG. 2.

As shown in block 510, the projection-based training system 200 receives a training dataset and a plurality of model weights. The training dataset can include a plurality of examples, each example including a plurality of features and a corresponding label for the plurality of features. The plurality of model weights can be associated with the machine learning model being trained. The plurality of model weight can be initial model weights for the first training iteration and updated model weights for subsequent training iterations.

The projection-based training system 200 can further receive one or more parameters for training the machine learning model. The one or more parameters can include learning rate, number of training iterations, batch size, noise multiplier associated with a privacy parameter, and/or gradient norm bound. The privacy parameter can be a value below a threshold, such as less than 1, to indicate a high privacy domain.

As shown in block 520, the projection-based training system 200 computes a plurality of gradients from the training dataset and the plurality of model weights based on the one or more parameters for training the machine learning model. The projection-based training system 200 can generate a mini-batch, e.g., subset, of the training dataset by uniform or random sampling and compute a gradient for each example in the mini-batch.

The projection-based training system 200 can further clip each of the plurality of gradients. The projection-based training system 200 can clip the gradients based on the gradient norm bound to ensure sufficient masking of any individual gradient for satisfying differential privacy.

As shown in block 530, the projection-based training system 200 aggregates and adds noise to the plurality of gradients based on the privacy parameter to generate a noisy aggregated gradient. The projection-based training system 200 can aggregate the plurality of gradients to generate an aggregated gradient. The projection-based training system 200 can add noise to the aggregated gradient based on the noise multiplier, gradient norm bound, and/or batch size to generate the noisy aggregated gradient.

As shown in block 540, the projection-based training system 200 denoises the noisy aggregated gradient via projecting to generate a projection-based gradient. The projection-based training system 200 can utilize a self-span denoiser, a self-conv denoiser, and/or an alt-conv denoiser, as examples. For the self-span denoiser, the projection-based training system 200 project the noisy aggregated gradient onto a span of per-example per-class gradients. For the self-conv denoiser, the projection-based training system 200 can project the noisy aggregated gradient onto a convex hull of per-example per-class gradients. For the alt-conv denoiser, the projection-based training system 200 can project the noisy aggregated gradient onto a convex hull of per-example per-class gradients determined by an alternative mini-batch of the training dataset from random sampling.

The projection-based training system 200 can further perform auto-differentiation to reduce the memory required to store a projection matrix representing the projection of the noisy aggregated gradient. The projection-based training system 200 can perform forward mode auto-differentiation to cumulatively compute a Jacobian-vector product of the projection-based gradient. Alternatively, or additionally, the projection-based training system 200 can perform reverse mode auto-differentiation to cumulatively compute a vector-Jacobian product of the projection-based gradient.

The projection-based training system 200 can further smooth a projection coefficient of the projection-based gradient. The projection-based training system 200 can smooth the projection coefficient using regularization based on a configurable regularization value. For example, the regularization value can be less than 1 to improve stability of the training process.

As shown in block 550, the projection-based training system 200 updates the plurality of model weights to generate a plurality of updated model weights based on the projection-based gradient. For the last training iteration, the projection-based training system 200 can update the plurality of updated model weights to generate a plurality of trained model weights based on the projection-based gradient.

Figure 6:
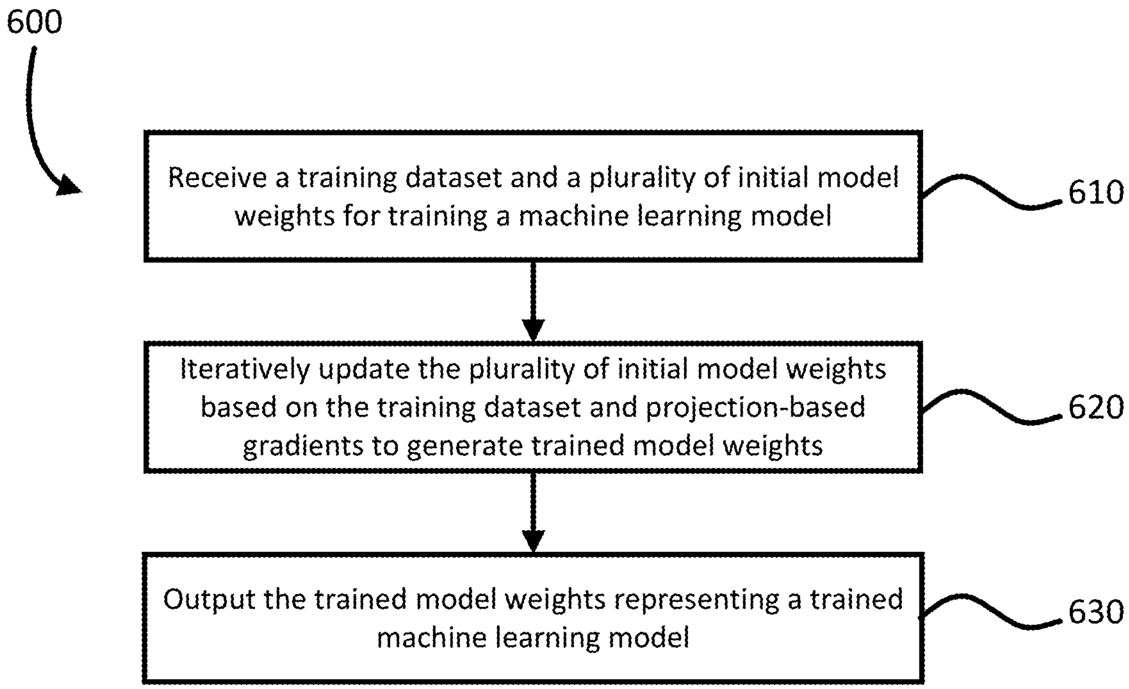
FIG. 6 depicts a flow diagram of an example process for training one or more machine learning models using differentially private labels according to aspects of the disclosure.

FIG. 6 depicts a flow diagram of an example process 600 for training one or more machine learning models using differentially private labels. The example process can be performed on a system of one or more processors in one or more locations, such as the projection-based training system 200 as depicted in FIG. 2.

As shown in block 610, the projection-based training system 200 can receive a training dataset and a plurality of initial model weights associated with a machine learning model to be trained. The projection-based training system 200 can further receive one or more parameters, such as learning rate, number of training iterations, batch size, noise multiplier associated with a privacy parameter, and/or gradient norm bound, indicating how the machine learning model will be trained. Block 610 can generally correspond to block 510 as depicted in FIG. 5.

As shown in block 620, the projection-based training system 200 can iteratively update the plurality of initial model weights based on the training dataset and projection-based gradients to generate a plurality of trained model weights. The projection-based training system 200 can perform a number of training iterations as depicted in FIG. 5 based on the received number of training iterations parameter to generate updated model weights for each training iteration. The final training iteration can generate the trained model weights.

As shown in block 630, the projection-based training system 200 can output the trained model weights to represent a trained machine learning model satisfying label differential privacy.

As illustrated in FIGS. 7-9, the projection-based training system as disclosed herein can achieve or improve upon alternative approaches for training machine learning models while guaranteeing differential privacy, particularly in the high privacy domain. The projection-based training system, referred to as LabelDP-Pro for evaluation, was compared to baselines using MNIST and CIFAR datasets. The MNIST and CIFAR datasets are image classification datasets. MNIST involves a task to recognize handwritten digits "0-9" and CIFAR involves a task to classify 10 image categories, e.g., airplane, cat, dog, ship, etc. The baselines include randomized response (RR), randomized response with debiased loss (RR-Debiased), label privacy multi-stage training (LP-2ST), additive Laplace with iterative Bayesian inference (ALIBI), and differential privacy stochastic gradient descent (DP-SGD).

As depicted in the table in FIG. 7, across both MNIST and CIFAR benchmarks, LabelDP-Pro consistently surpassed the baseline mechanisms when the privacy parameter was less than 1. Notably, the performance gap also widens as the privacy parameter decreases. For instance, when $\varepsilon=0.2$, the baseline mechanisms achieve accuracy levels close to random guessing, while LabelDP-Pro maintains a non-trivial accuracy at 92.9% on MNIST and 30.8% on CIFAR. These results demonstrate the effectiveness of LabelDP-Pro in preserving utility. Compared to the DP-SGD mechanism, LabelDP-Pro also consistently exhibits superior performance, underscoring the effectiveness of the projection-based denoising. Notably, this performance gap tends to be more pronounced when dealing with smaller privacy parameters.

Since the features are public in label differential privacy, self-supervised learning (SelfSL) techniques can be utilized to obtain high-quality representations to further improve performance. These representations can be learned solely from the input features without requiring labels. Then, the representations can be input to the private supervised training pipelines alongside the corresponding labels. This approach was demonstrated by evaluating LabelDP-Pro with SelfSL on the CIFAR dataset and comparing to RR, RR-Debiased, RR-With-Prior, DP-SGD, and PATE-FM baselines. As depicted in the table in FIG. 8, LabelDP-Pro consistently outperforms all the baselines to which it was compared in higher privacy domains.

LabelDP-Pro was also evaluated with user-level privacy, which may protect an entire contribution of a user instead of guaranteeing privacy for individual items. User-level differential privacy can offer more stringent but realistic protection against adversaries, especially in digital content management domains. LabelDP-Pro was evaluated using a Criteo Attribution Modeling for Bidding dataset, which includes a 30-day sample of live traffic data from Criteo, a company that provides online display advertisements. Each example in the dataset corresponds to a banner impression shown to a user, and whether it resulted in a conversion attributed to Criteo. Each user may contribute to multiple examples in the dataset. A training dataset and an evaluation dataset was created from randomly selected data from the Criteo dataset. For the training data, the maximum number of examples any one user can contribute is capped at k, where k is varied to be {2, 5, 10}. An attribution model is trained with cross-entropy loss and the area under curve (AUC) is reported in the table depicted in FIG. 9. As depicted, LabelDP-Pro consistently exhibits superior performance compared to RR when the privacy parameter is less than 5, across various values of k. As k increases, the performance gap between RR and LabelDP-Pro widens.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for training a machine learning model with differentially private labels comprising:

receiving, by one or more processors, a training dataset and plurality of model weights;

computing, by the one or more processors, a plurality of gradients from the training dataset and plurality of model weights based on one or more parameters for training the machine learning model;

aggregating, by the one or more processors, the plurality of gradients and adding, by the one or more processors, noise to the plurality of gradients based on a privacy parameter to generate a noisy aggregated gradient;

denoising, by the one or more processors, the noisy aggregated gradient via projecting to generate a projection-based gradient; and updating, by the one or more processors, the plurality of model weights to generate a plurality of updated model weights based on the projection-based gradient.

2. The method of claim 1, wherein the one or more parameters comprises at least one of learning rate, number of training iterations, batch size, noise multiplier, or gradient norm bound.

3. The method of claim 1, wherein the privacy parameter is below a threshold value indicating a high privacy domain.

4. The method of claim 1, further comprising clipping, by the one or more processors, the plurality of gradients.

5. The method of claim 1, further comprising iteratively performing the computing, aggregating, denoising, and updating for a number of training iterations.

6. The method of claim 5, further comprising outputting, by the one or more processors, a trained machine learning model with trained model weights after performing the number of training iterations.

7. The method of claim 1, wherein denoising the noisy aggregated gradient further comprises projecting the noisy aggregated gradient onto a span of per-example per-class gradients.

8. The method of claim 1, wherein denoising the noisy aggregated gradient further comprises projecting the noisy aggregated gradient onto a convex hull of per-example per-class gradients.

9. The method of claim 1, wherein denoising the noisy aggregated gradient further comprises projecting the noisy aggregated gradient onto a convex hull of per-example per-class gradients based on a random batch of examples generated from the training dataset.

10. The method of claim 1, wherein denoising the noisy aggregated gradient further comprises performing auto-differentiation.

11. The method of claim 10, wherein performing auto-differentiation further comprises performing forward mode auto-differentiation to cumulatively compute a Jacobian-vector product of the projection-based gradient.

12. The method of claim 10, wherein performing auto-differentiation further comprises performing reverse mode auto-differentiation to cumulatively compute a vector-Jacobian product of the projection-based gradient.

13. The method of claim 1, wherein denoising the noisy aggregated gradient further comprises smoothing a projection coefficient of the projection-based gradient using regularization.

14. A system comprising:

one or more processors; and one or more storage devices coupled to the one or more processors and storing instructions that, when executed by the one or more processors, cause the one or more processors to perform operations for training a machine learning model with differentially private labels, the operations comprising:

receiving a training dataset and plurality of model weights;

computing a plurality of gradients from the training dataset and plurality of model weights based on one or more parameters for training the machine learning model;

aggregating the plurality of gradients and adding, by the one or more processors, noise to the plurality of gradients based on a privacy parameter to generate a noisy aggregated gradient;

denoising the noisy aggregated gradient via projecting to generate a projection-based gradient; and updating the plurality of model weights to generate a plurality of updated model weights based on the projection-based gradient.

15. The system of claim 14, wherein the operations further comprise clipping, by the one or more processors, the plurality of gradients.

16. The system of claim 14, wherein the operations further comprise:

iteratively performing the computing, aggregating, denoising, and updating for a number of training iterations; and outputting a trained machine learning model with trained model weights after performing the number of training iterations.

17. The system of claim 14, wherein denoising the noisy aggregated gradient further comprises at least one of:

projecting the noisy aggregated gradient onto a span of per-example per-class gradients;

projecting the noisy aggregated gradient onto a convex hull of per-example per-class gradients; or projecting the noisy aggregated gradient onto a convex hull of per-example per-class gradients based on a random batch of examples generated from the training dataset.

18. The system of claim 14, wherein denoising the noisy aggregated gradient further comprises performing auto-differentiation by performing at least one of:

forward mode auto-differentiation to cumulatively compute a Jacobian-vector product of the projection-based gradient; or reverse mode auto-differentiation to cumulatively compute a vector-Jacobian product of the projection-based gradient.

19. The system of claim 14, wherein denoising the noisy aggregated gradient further comprises smoothing a projection coefficient of the projection-based gradient using regularization.

20. A non-transitory computer readable medium for storing instructions that, when executed by one or more processors, cause the one or more processors to perform operations for training a machine learning model with differentially private labels, the operations comprising:

receiving a training dataset and plurality of model weights;

computing a plurality of gradients from the training dataset and plurality of model weights based on one or more parameters for training the machine learning model;

aggregating the plurality of gradients and adding, by the one or more processors, noise to the plurality of gradients based on a privacy parameter to generate a noisy aggregated gradient;

denoising the noisy aggregated gradient via projecting to generate a projection-based gradient; and updating the plurality of model weights to generate a plurality of updated model weights based on the projection-based gradient.

* * * * *